Sept. 14, 1954     J. D. GORDON     2,688,832
ADJUSTABLE ROTARY BEATER FOR AGRICULTURAL MACHINES
Filed May 19, 1952     6 Sheets-Sheet 1

INVENTOR
JOHN D. GORDON
BY
ATTORNEYS

Sept. 14, 1954    J. D. GORDON    2,688,832
ADJUSTABLE ROTARY BEATER FOR AGRICULTURAL MACHINES
Filed May 19, 1952    6 Sheets-Sheet 2

INVENTOR
JOHN D. GORDON
BY
ATTORNEYS

Sept. 14, 1954　　　　J. D. GORDON　　　　2,688,832
ADJUSTABLE ROTARY BEATER FOR AGRICULTURAL MACHINES
Filed May 19, 1952　　　　　　　　　　　　6 Sheets-Sheet 4

INVENTOR
JOHN D. GORDON

BY
ATTORNEYS

Patented Sept. 14, 1954

2,688,832

UNITED STATES PATENT OFFICE 2,688,832

ADJUSTABLE ROTARY BEATER FOR AGRICULTURAL MACHINES

John D. Gordon, Boise, Idaho, assignor to Olson Manufacturing Company, Boise, Idaho, a corporation of Idaho Application May 19, 1952, Serial No. 288,679

7 Claims. (Cl. 55—118)

The present invention relates to agricultural machines and more particularly to improvements in rotary beaters such as disclosed in the Agee et al. Patent 2,506,054, May 2, 1950 for disintegrating or removing the tops of vegetable plants and the like as the machine travels over a field.

An important object is to provide an agricultural machine such as a rotary beater or the like with a wheel supported cross beam or member and a housing or hood in which is rotatably mounted, impact members such as flexible flails. The housing is laterally spaced from the cross beam so as to be in front thereof, and spring suspension means are provided for pivotally connecting the sides of the housing to the cross beam in order that the rear end of the housing and the flails may be vertically adjustable to vary the length of the flails relative to the ground and without disturbing the angular relationship of the cross beam with the surface over which the machine passes.

A further object consists in providing a rotary beater topper or macerator for vegetable plants and the like, including a vertically displaceable housing, a wheel supported cross beam, and spaced pairs of longitudinally extending parallel torque bars that are pivotally connected to the cross beam and to opposite sides of the housing so as to provide a movable connection of the housing with the cross beam. Additionally, spring suspension means are connected to the pair of torque bars and the adjacent sides of the housing to insure the housing and its associated parts being supported in proper balanced position by the cross beam, as the machine is towed over the ground or field by a tractor or the like.

Another object consists in associating with the rotary flail an endless belt driving mechanism provided with tensioning means for adjusting the belt to insure proper and efficient operation of the machine.

Other objects and advantages of the invention will become apparent from the following description when taken in conjunction with the accompanying claims and drawings.

Referring to the drawings in which are shown several preferred embodiments of the invention:

Figure 2 is a side view of Figure 1 showing the machine connected to a towing tractor or the like;

Figure 5 is a sectional view taken substantially along the line 5—5 of Figure 4;

Figure 4:
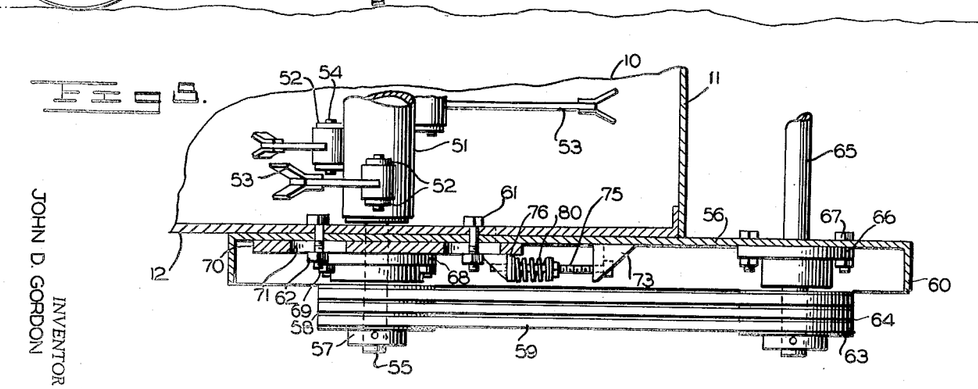
Figure 4 is a detailed side view showing the machine in its raised position and the axle in front of the cross beam.

Referring to the drawings, 10 designates a disintegrating machine such as a rotary beater, and which preferably is provided with a vertically displaceable curved housing or hood 11 (Figure 1) having closed sides 12. A centrally disposed tongue or drawbar extends outwardly from the housing 10 so as to be detachably connected as at 14 (Fig. 2) to a towing tractor or the like 15. Extending transversely of the housing 11 adjacent the front thereof is a cross bar or strap 16 to which is medially connected a bracket 17. The tongue 13 may be connected to the housing by the reinforcing bars 18 and the retaining plates 19 secure by the bolts 20 to the tongue 13. A rear cross beam or member 21 is longitudinally spaced from the housing 10 and is supported by the ground wheels 22. Each of the wheels 22 is connected to a strut 23 having a pair of coacting clamps 24 and 25 shaped to conform with the configuration of the cross beam 21 and be secured thereto by the threaded bolts 26 and nuts 27 (Fig. 4). The strut 23 may be connected to the beam 21 so that the wheels 22 extend either rearwardly or forwardly thereof.

Figure 1:
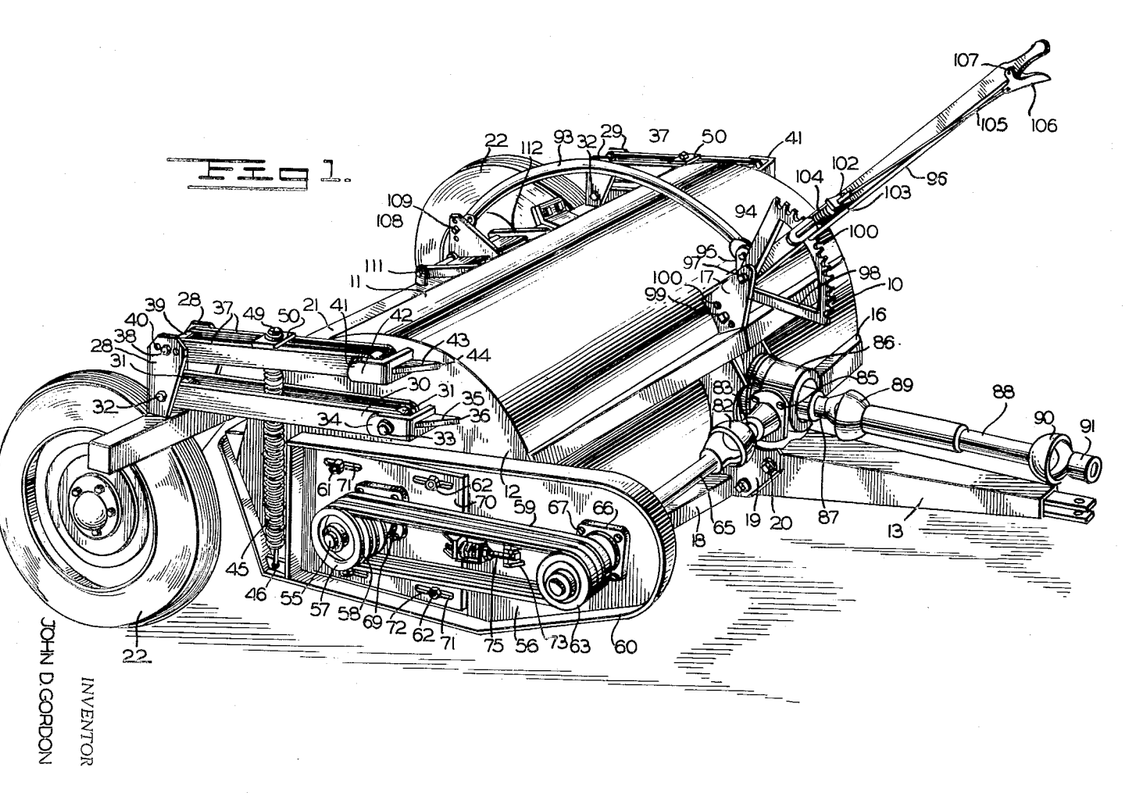
Figure 1 is a front perspective view of the improved disintegrating machine.

Adjacent the ends of the beam 21 are spaced pairs of upstanding brackets 28 and 29 similar in shape and size. Between each pair of these brackets are a lower pair of torque bars or arms 30 which extend longitudinally and forwardly from the beam 21 and are maintained in spaced parallel position by the spacer tubes 31 carried by the pins 32 and 33 respectively. The pins 32 extend transversely through the spaced brackets 28 while the pins 33 extend through bifurcated members 34 provided with the webs 35 that are welded to the outer surface of each of the sides 12 as at 36 (Fig. 1). A pair of similarly formed torque bars 37 of shorter length than the bars 30 are connected by the bolts 38 and spacer tubes 39 to the spaced brackets 28 and 29. Each of these brackets may be provided with spaced openings 40 for adjustably connecting the bars 37 thereto. The front end of each of the bars 37 is pivotally connected to a bifurcated member 41 by the transverse bolt 42. The member 41 is similar in shape to the member 32 and has a web 43 which is welded as at 44 to the side 12 of the housing. It will be noted that an upper and lower pair of the torque bars or members 30 and 37 are positioned on opposite sides of the housing and constitute a pivotal or free floating connection of the housing 11 and its associated parts with the rear cross beam 21. A coil spring 45 extends downwardly from the top of each of the upper bars 37 and between the lower bars 30 and substantially centrally thereof so as to be connected at its lower end as at 46 (Fig. 1) to one side of the machine. The upper end of the coil spring 45 has welded or otherwise secured thereto an internally threaded nut 47 (Fig. 4) for receiving the threaded stem 48 of a bolt 49 that loosely extends through a stop plate 50 that rests against the top of torque bars 37. It will be seen that upon threading of the bolt 49 into the nut 47 that this inward movement will cause extension of the coil spring 45 and conversely turning of the bolt 49 in the opposite direction will allow contraction of the spring. Thus, the springs 45 support the rear end of the housing 10 and serve to absorb the rotational vibration caused by unbalance at the high speed at which the flails 53 operate.

Mounted within the housing 11 is a transversely disposed rotatable flail shaft 51 (Fig. 6) on which are mounted radially extending pairs of spaced lugs 52 between each pair of which is pivotally connected a flail or impact member 53 by a transverse pin 54 (Fig. 5). These flails are arranged in transverse rows and circumferentially spaced relative to one another so as to completely cover the operating area over which the machine travels. It will be seen that when the parts are assembled the torque bars provide a pivotal connection between the housing assembly and the cross beam 21 so that the housing 11 may be raised or lowered in order to vertically adjust the flails 53 relative to the ground without disturbing or moving the crossbeam 21. The shaft 51 has reduced end portions 55 (Fig. 5) which extend through the sides 12. One end 55 also extends through a connecting plate 56 and has keyed or otherwise secured thereto a belt sheave or pulley 57 (Fig. 5). The sheave 57 is provided with spaced circumferentially disposed V-shaped grooves 58 for receiving complementary formed endless V-shaped belts 59. As shown, three of these grooves are formed in each of the sheaves 57 for receiving three endless belts 59 and are so designed as to protect the driving mechanism against shock loading. The plate 56 is preferably shaped as shown in Figure 1 and is provided with a continuous outwardly extending flange 60, that forms a compartment or chamber arranged to be closed by the cover 72 (Fig. 2). The plate 56 may be secured to the end 12 of the housing in any suitable manner such as by the spaced threaded bolts 61 and nuts 62. The sheave 57 is in longitudinal alignment with a complementary formed belt sheave 63 having three spaced circumferentially disposed grooves 64 for receiving the V-shaped endless belts 59.

The pulley 63 is keyed or otherwise connected to an operating shaft 65 carried by a bearing plate 66, that is secured as at 67 to the plate 56 (Fig. 5). Similarly, the rotor shaft 51 is connected to the side 12 of the housing and the plate 56 by a bearing plate 68 and the bolts 69. In order to maintain the endless belts 59 in proper driving position, belt tensioning means are provided in the form of a longitudinally adjustable bearing carrier or plate 70 (Fig. 1) which is interposed between the bearing plate 68 and the plate 56, and which is provided with longitudinally spaced pairs of horizontal slots 71 arranged to receive the clamping bolts 61 (Fig. 5) so as to be clamped thereto by the nuts 62. Extending laterally from one side 12 of the housing and between the endless belts 59, is a bifurcated bracket member 73, the web 74, of which has a central opening through which longitudinally extends a threaded bolt 75 (Fig. 4) the stem of which extends through a fixed lug 76 on the adjustable carrier plate 70 and in transverse alignment with the web 74. An angulated indicating member 77 is carried by each of the bolts 75 and has a horizontal pointer 78 arranged to be moved in vertical alignment with the lug 76. An adjusting nut 79 is threaded on the stem 75 and a coil spring 80 is confined between the lug 76 and the angulated member 77. A bearing or stop member 81 is positioned between the members 73 and has an opening through which the bolt 75 loosely extends so as to receive the thrust from the head of the bolt.

The belt tensioning means is so arranged that when the spring 80 is compressed to a position so that the end of the pointer 78 is substantially in vertical alignment with the lug 76, it will indicate that the belts are properly tensioned. This can be effected by loosening the nuts 62 so that the bearing carrier 70 and its associated parts can be moved longitudinally in order that the shaft 55 may be properly spaced from the shaft 65 to insure proper tensioning of the belts 59. The nuts 62 are then tightened on the bolts 61 to maintain the parts in proper position.

The shaft 65 (Fig. 1) is operatively connected through a universal joint 82 to a spacer shaft 83 carried by bearing plate 84 secured as at 85 to a gear housing 86 in which is mounted suitable high speed gearing, not shown, which is operatively connected to a shaft 87 and the drive shaft 88 through a universal joint 89. The shaft 88 is connected through a universal joint 90 with the propeller or drive shaft 91 of the tractor. Thus, positive drive means are provided for rotating the flails at a very high speed, as the machine is drawn or moved along the ground.

Figure 3:
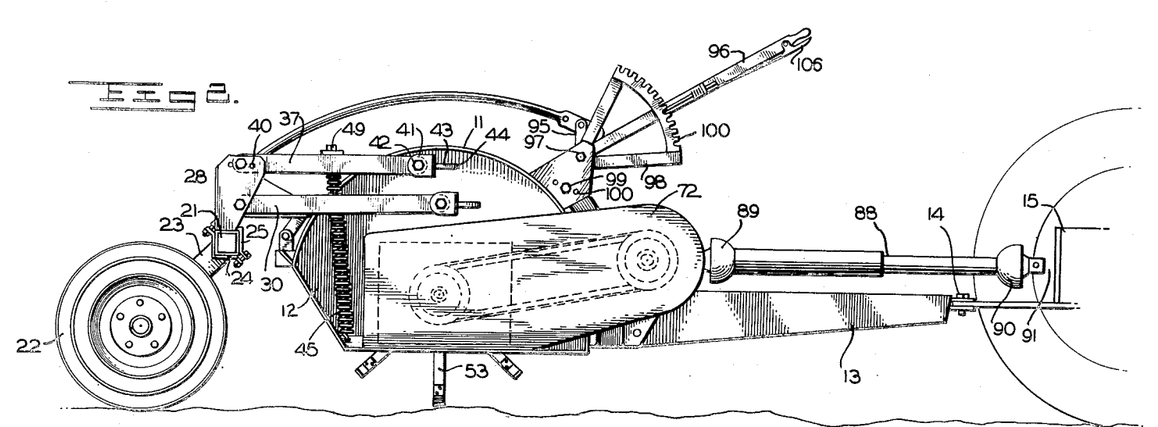
Figure 3 is a plan view of Figure 1 showing parts removed for clearness of illustration.
Figures 3, 7:
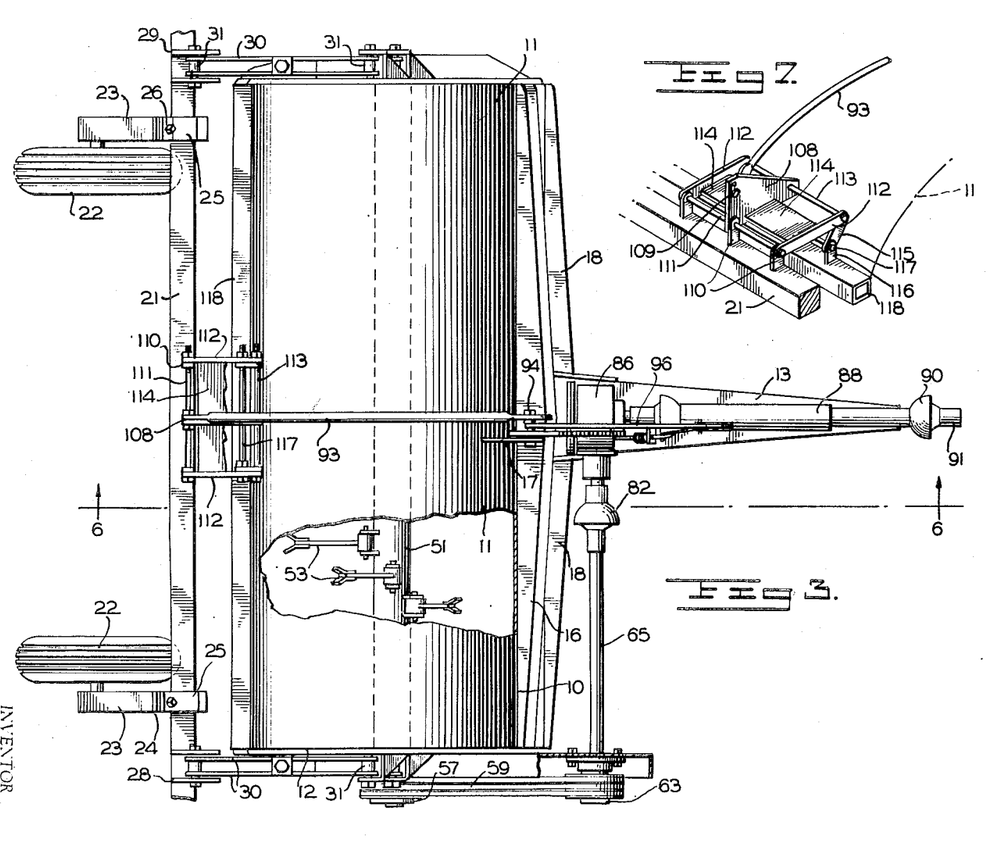
Figure 7 is a detailed perspective view with parts in section showing the means for operatively connecting the flail housing to the wheel supported cross beam.

In order that the flail 53 may be maintained in proper vertical adjustment relative to the ground during the disintegrating operation means are provided for raising or lowering the rear end of the housing 11 and the rotor shaft 51 about the pivot point 14 (Fig. 2) and without disturbing the relative position of the cross beam 21 and wheels 22 during the operation of the machine. As shown in Figure 1 manual means are provided for adjusting the flails, and comprises a lift control strut or arm 93 which is pivotally connected at its front end as at 94 to an arm 95 of the operating bell crank lever 96, that in turn is pivoted as at 97 to the bracket 17. A quadrant member 98 is adjustably connected to the bracket 17 by the bolt 99 which selectively extends through openings 100 (Fig. 1) and is held in a fixed position by the bolt 97. The quadrant 98 has circumferentially spaced teeth 101 arranged to receive a locking pin 102 carried by a U-shaped bracket member 103, and is normally urged in a locking position by coil spring 104 confined between the spaced arms of the bracket member 103. A lever rod 105 is connected to the locking pin 102 so as to form an extension thereof and also to a hand grip 106 pivoted at 107 to the lever 96. The rear end of the strut 93 is adjustably connected to a plate 108 (Fig. 7) as at 109. The plate 108 is disposed centrally of the cross beam 21 and may be mounted thereon between spaced lugs 110 having transverse aligned openings through which extend a rod 111. Projecting forwardly from the ends of the rod 111 are links 112 which are connected at their front ends by a transverse rod or bolt 113 that extends through the plate 108. Reinforcing straps 114 may extend laterally from opposite sides of the plate 108 so as to abut the links 112 and thus provide a movable but rigid connection between the control strut 93 and the cross beam 21. Depending links 115 pivotally connected to the transverse rod 113 are also connected by lugs 116 and a rod 117 to a transversely disposed shoulder or flanged portion 118 formed or connected to the rear end of the curved housing or hood 11 (Fig. 7). Thus, it will be seen that a simple, efficient and positive lifting mechanism is provided for moving the housing 11 vertically in order to adjust the flails 53 relative to the ground while maintaining the beam 21 and wheels 22 as they move over a field in the same angular relationship with the ground. The lower torque arms 31 are of longer length than the upper torque arms 37, so that as the operating lever 96 is actuated to raise or lower the flails, the rear ends of the torque arms will move in a substantially vertical plane.

When assembling the machine, in order that the counterbalance springs 45 will efficiently absorb rotational vibration, the housing and rotor assembly are initially mounted on the cross beam 21 by first positioning a support or block such as 119 (Fig. 6) under the end of the tongue 13. Assuming that the machine is completely assembled and disconnected from the tractor, the control strut 93 is disconnected from the plate 28 so as to assume the position shown in dotted lines in Figure 6 so that the machine is now suspended by the counterbalance springs 45 and floats free on the springs. The adjusting bolts 49 are then tightened so that the tips of the flails or impact members 53 are at their extreme low position as determined by the particular purpose the machine is to be used. It will, of course, be necessary to adjust each of the springs 45 on opposite sides of the housing individually due to the side carrying the belt drive being heavier than the other. It is, of course, essential that the elastic belts 59 be operated at all times at proper tension. Should these belts become loose they may be quickly tensioned upon loosening the bolts 62 so as to longitudinally adjust the carrier 70 to move the shaft 55 so as to tighten the belts. To insure proper adjustment, the nut 79 on the bolt 75 (Fig. 4) is rotated until the spring 80 is compressed so that the pointed end 78 of the indicator is in vertical alignment with the lug 76 on the carrier 70. The bolts 62 are then tightened so as to maintain the rotor shaft and sheave 57 in proper operative position relative to the front sheave 63.

Figure 6:
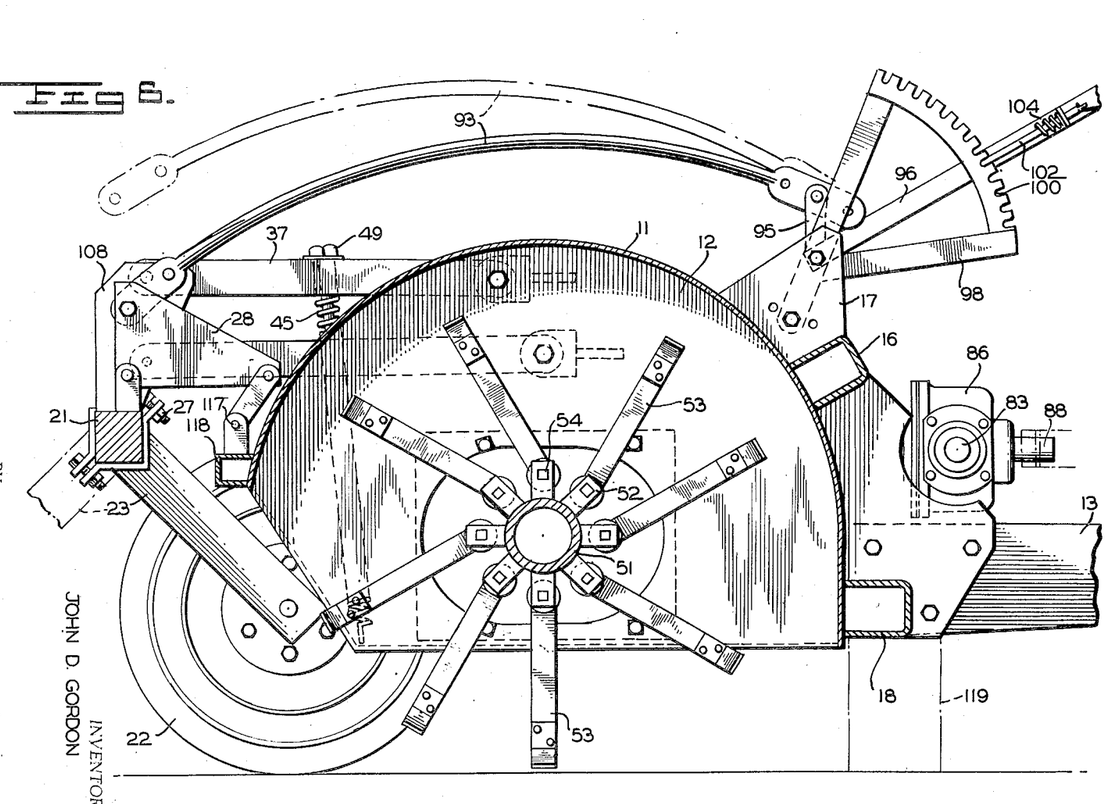
Figure 6 is a sectional view taken substantially along the lines 6—6 of Figure 3.
Figure 8:
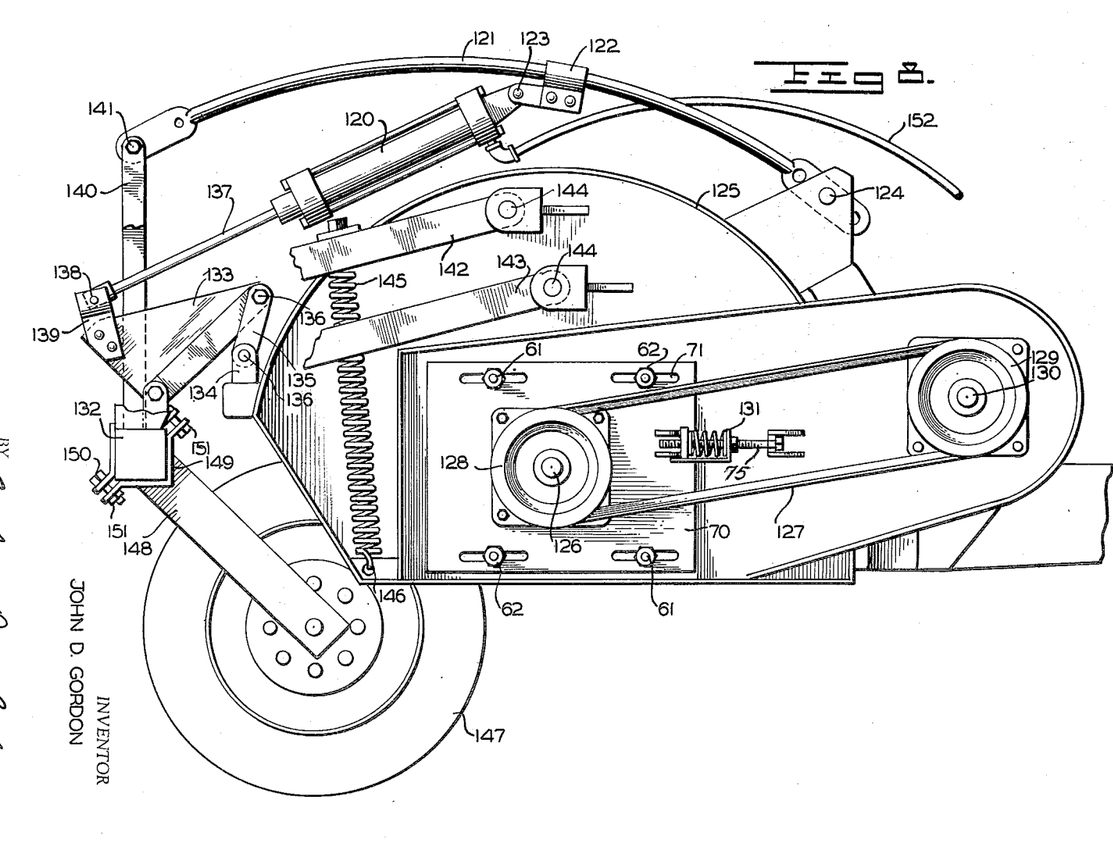
Figure 8 is a side view of a modified form of the invention.

Instead of providing manual lifting means for adjusting the flails relative to the ground, fluid pressure means may be provided. As shown in Figure 8 the parts are substantially similar in construction and operation to those previously described with the exception that instead of manual means, a fluid pressure cylinder 120 is operatively connected to the lift control strut 121 by a clamp 122 and a pivot pin 123. The front of the control strut 121 is adjustably connected as at 124 to the curved flail housing 125 in which is rotatably mounted a rotor shaft such as 126 that is similar in construction and operation to the rotor shaft 51 previously described. The shaft 126 is arranged to be driven by the endless V-belts 127 which pass over the sheave 128 keyed to the shaft 126 and a sheave 129 keyed to an operating shaft 130. The tension of the belts 127 may be adjusted by tensioning mechanism 131 connected to the plate 70 and similar in construction and operation to the tensioning device previously described. This plate 70 is maintained in adjusted position by the bolts 61 that extend through the slots 71 and are secured in place by the nuts 71, in the manner previously described. The rear cross beam 132 is medially connected to a bracket 133 which in turn is pivotally connected to a lug 134 on the housing 125 by the links 135 and pins 136. The cylinder 120 has a piston rod 137 extending outwardly therefrom so as to be pivotally connected as at 138 to a lug or plate 139 fixed to the plate 133. Extending upwardly from the cross beam 132 adjacent the plate 133 is a fixed strap 140 which is adjustably connected as at 141, the lift control strut 121. Torque bars 142 and 143 similar in construction and operation to the torque bars previously described, are pivotally connected to opposite sides of the housing 125 as at 144 and also to the cross beam 132 in a manner similar to the connection shown in Figure 1. A counterbalance spring 145 is adjustably connected to the torque bars and also to the machine as at 146. Ground wheels 147 are connected by the strut arms 148 and the clamp 149 to the cross beam 132 and are detachably connected thereto by the bolts 150 and nuts 151. The wheels 147 may be mounted either in front or rear of the cross beam 132 or may extend rearwardly and forwardly thereof as indicated in Figure 6. Fluid under pressure is introduced into the cylinders 120 by the flexible hose 152 which extends forwardly so as to be connected to a supply tank and a control valve, not shown, preferably positioned adjacent the seat of the operator of the tractor.

Thus it will be seen that simple, efficient economical and positive means are provided for adjustably suspending the housing and impact members relative to a wheel supporting rear beam, so as to readily adjust the flails or impact members 53 relative to the ground, for the purpose of disintegrating or removing the tops of vegetable plants such as potato vines, beet tops, and likewise for disintegrating coarse or heavy vegetable tops such as corn stalks and the like. In this connection, it may be mentioned that due to the high rotational speed of the flails the spring or tandem suspension means has been provided to absorb the rotational vibration of the machine. Moreover, the V-belt and belt tensioning means insure efficient operation of the flails at high speed, which would be difficult of accomplishment if a chain drive were used.

The size and dimension of the machine may be varied in accordance with the particular operating conditions and the purpose to which the device is to be applied. It may be mentioned that the torque bars and spring suspension assembly are so designed, that when the disintegrating machine is mounted in an operating position on the towing tractor 13, the hood 10 and flails 53 may be raised or lowered to any position as the front of the machine moves or swings bodily about the pivot 14. During this movement the rear cross beam or member 21 as well as the wheels 22 will remain in the same angular relationship with the ground. This is true whether the wheels 22 are positioned forward or rearwardly of the beam 21 or arranged on both sides thereof. In this connection it may be mentioned that when the wheels are mounted on opposite sides of the beam 21 they are arranged so that the wheels which contact the highest ground will also carry the load of the machine. The balance suspension of the machine is so designed that on level ground all wheels carry an equal share of the load through the entire vertical adjustment range of the lifting mechanism. Moreover, the special torque suspension and spring arrangement insures the weight of the housing and the rotor shaft assembly being carried by the springs 45 through the torque bars directly to the rear beam 21 and to the ground engaging wheels 22, without transferring any excessive weight to other parts of the machine. Thus, the flails may be vertically adjusted either manually or by fluid operating means by the application of very little power, with the result that relatively light material may be used in the construction of the parts. The indicator means 77 provides a spring balance for determining the belt tension so as to indicate when this tension is achieved. The pivotal connection of the springs 45 through the torque bars with the rear cross member 21 also insures the accurate positioning laterally of the crossbeam 21 with respect to the housing 11 and the flail rotor shaft 51. It also limits the amount of difference in height variation from side to side, obtainable by variation in spring load adjustment. The spring suspension also provides means for compensation in velocity ratio of the lifting mechanism so as to compensate for the variation in spring tension between the high and low positions the housing 10 and flails 53 may assume. In other words, when the housing is low, the effect of the spring counterbalance is high and the velocity ratio of the lift on the strut arm 93 is high. Conversely, when the housing 10 is moved to its uppermost position (Fig. 4), the effect of the spring counterbalance is low and the velocity ratio of the lift on the strut 93 is likewise low.

It will be understood that the forms of the invention shown are merely illustrative and that such changes may be made as come within the scope of the following claims.

I claim:

1. An agricultural machine of the class described arranged to be connected to a towing tractor or the like, said machine including a wheel supported cross beam, a vertically displaceable housing in front of said cross beam, a rotor shaft transversely mounted in said housing, impact members connected to said shaft and extending radially and outwardly therefrom, means operatively connected to said shaft for rotating said impact members, spaced parallel pairs of torque members on each side of said housing and pivotally connected thereto, means pivotally connecting each pair of torque members to said cross beam, a tension spring suspended from each pair of said torque members and connected to the machine, said torque members coacting with the tension springs for insuring the housing at all times being supported in proper balanced position by the crossbeam, and means operatively connected to the housing and to said cross beam for vertically moving the housing and the impact members relative to the ground.

2. An agricultural machine as called for in claim 1 in which each pair of torque members includes upper bars and lower bars, the upper bars being of shorter length than the lower bars.

3. An agricultural machine as called for in claim 1 in which manually operable means is connected to the housing for moving the same and the impact members vertically relative to the ground.

4. An agricultural machine as called for in claim 1 in which fluid pressure operated means is connected to the housing for moving the same and the flails vertically relative to the ground.

5. An agricultural machine as called for in claim 1 in which an endless belt driving means is operatively connected to the rotary shaft for rotating the impact members, and belt tensioning means is operatively connected to said driving means for maintaining the belts in proper driving position.

6. An agricultural machine of the class described arranged to be connected to a towing tractor or the like, said machine including a wheel supported cross beam, a rotor shaft transversely mounted in said housing, impact members connected to said shaft and extending radially and outwardly therefrom, means operatively connected to said shaft for rotating said impact members, said cross beam adjacent the ends thereof having upwardly extending brackets, a pair of longitudinally extending parallel torque bars pivotally connected to one of said brackets and extending outwardly and forwardly therefrom, means pivotally connecting said pair of torque bars to one side of said housing, a pair of longitudinally extending parallel torque bars pivotally connected to the other bracket at the opposite side of said housing, each of said pair of torque bars having a spring extending downwardly therefrom and connected at its lower end to a side of the housing, means for adjusting the tensioning of each spring, said torque bars coacting with said springs for insuring the housing at all times being supported in proper balanced position by the crossbeams, a control bracket pivotally connected to said cross beam and the rear of said housing, an operating lever pivotally connected to the housing, means operatively connecting the operating lever to said control bracket so as to move the housing vertically relative to the cross beam in order to adjust the impact members relative to the ground.

7. An agricultural machine of the class described arranged to be connected to a towing tractor or the like, said machine including a wheel supported cross beam, a vertically displaceable housing in front of said cross beam, a rotor shaft transversely mounted in said housing, impact members connected to said shaft and extending radially and outwardly therefrom, means operatively connected to said shaft for rotating said impact members, said cross beam adjacent the ends thereof having upwardly extending brackets, a pair of longitudinally extending parallel torque bars pivotally connected to one of said brackets and extending outwardly and forwardly therefrom, means pivotally connecting said pair of torque bars to one side of said housing, a pair of longitudinally extending parallel torque bars pivotally connected to the other bracket and the opposite side of said housing, each of said pairs of torque arms having a spring extending downwardly therefrom and connected at its lower end to a side of the housing, means for adjusting the tension of each spring, said torque bars coacting with the springs for insuring the housing at all times being supported in proper balanced position by the crossbeam, a control plate pivotally connected to said cross beam and the rear of said housing, an operating lever pivotally connected to the housing, and means operatively connecting the operating lever to said control plate so as to move the housing vertically relative to the cross beam in order to vertically adjust the impact members relative to the ground and without disturbing the angular relationship of the cross beam with the ground over which the machine passes.

References Cited in the file of this patent

UNITED STATES PATENTS

| Number | Name | Date |
|---|---|---|
| 2,335,054 | Godwin | Nov. 23, 1943 |
| 2,506,054 | Agee et al. | May 2, 1950 |
| 2,537,586 | Huiteman | Jan. 9, 1951 |
| 2,556,446 | Roach | June 12, 1951 |
| 2,571,669 | Boyce et al. | Oct. 16, 1951 |
| 2,585,296 | Bennett et al. | Feb. 12, 1952 |